United States Patent
Dornbierer

(10) Patent No.: US 10,271,527 B2
(45) Date of Patent: Apr. 30, 2019

(54) PROTECTIVE DEVICE FOR ANIMAL BREEDING, SUCH AS THE BREEDING OF FISH, MUSSELS OR MOLLUSKS

(71) Applicant: Geobrugg AG, Romanshorn (CH)

(72) Inventor: Urs Dornbierer, Rorschacherberg (CH)

(73) Assignee: Geobrugg AG, Romanshorn (CH)

( * ) Notice: Subject to any disclaimer, the term of this patent is extended or adjusted under 35 U.S.C. 154(b) by 230 days.

(21) Appl. No.: 14/880,314

(22) Filed: Oct. 12, 2015

(65) Prior Publication Data
US 2016/0100560 A1 Apr. 14, 2016

(30) Foreign Application Priority Data
Oct. 14, 2014 (CH) ...................................... 1590/14

(51) Int. Cl.
*A01K 61/54* (2017.01)
*A01K 61/60* (2017.01)

(52) U.S. Cl.
CPC .............. *A01K 61/54* (2017.01); *A01K 61/60* (2017.01); *Y02A 40/822* (2018.01); *Y02A 40/824* (2018.01); *Y02A 40/826* (2018.01)

(58) Field of Classification Search
CPC ........ A01K 61/10; A01K 61/60; A01K 61/65; A01K 61/54; A01K 61/59; Y02A 40/824; Y02A 40/826; Y02A 40/822
USPC ....................................................... 119/223
See application file for complete search history.

(56) References Cited

U.S. PATENT DOCUMENTS

| 4,084,543 A * | 4/1978 | Pequegnat ............. A01K 61/60 119/200 |
| 4,597,360 A | 7/1986 | Johnson |
| 4,930,444 A * | 6/1990 | Vasile .................... A01K 61/60 119/223 |
| 4,986,389 A | 1/1991 | Halligan, Sr. et al. |
| 5,172,649 A * | 12/1992 | Bourgeois ............. A01K 61/60 119/223 |
| 5,193,481 A | 3/1993 | Loverich et al. |
| RE34,971 E * | 6/1995 | Loverich ................ A01K 73/12 119/223 |

(Continued)

FOREIGN PATENT DOCUMENTS

| EP | 2580958 A1 | 4/2013 |
| EP | 2664236 A1 | 11/2013 |

(Continued)

OTHER PUBLICATIONS

Abstract of EP 2580958.

(Continued)

*Primary Examiner* — Joshua D Huson
(74) *Attorney, Agent, or Firm* — Brian Roffe

(57) ABSTRACT

Protective device for animal breeding, such as the breeding of fish, mussels or mollusks, includes at least an inner cage that can be positioned in a body of water and which is formed from a net. This inner cage is dimensioned with a mesh width such that the animals to be bred are retained within the net. It is preferably totally surrounded by at least one outer cage spaced apart from the inner cage, and which is produced from a net made of thin wires and/or strands. The mesh width of the outer cage is greater than the mesh width of the inner cage, and it is thus guaranteed that predators cannot damage the net of the inner cage from the outside.

18 Claims, 2 Drawing Sheets

(56) References Cited

U.S. PATENT DOCUMENTS

| | | | |
|---|---|---|---|
| 5,549,076 A | 8/1996 | Kaarstad | |
| 5,582,266 A * | 12/1996 | Rexroad | A62B 1/22 |
| | | | 182/138 |
| 6,062,170 A * | 5/2000 | Finch | A01K 61/60 |
| | | | 119/215 |
| 6,216,635 B1 * | 4/2001 | McRobert | A01K 61/60 |
| | | | 119/201 |
| 6,279,858 B1 * | 8/2001 | Eicher | B21D 11/07 |
| | | | 245/8 |
| 6,520,115 B2 * | 2/2003 | Boyd | A01K 61/60 |
| | | | 119/223 |
| 6,659,044 B2 | 12/2003 | Salinas | |
| 8,393,297 B2 | 3/2013 | Amils et al. | |
| 8,424,491 B2 | 4/2013 | Page | |
| 9,185,887 B2 | 11/2015 | Suazo Luengo | |
| 9,333,553 B2 | 5/2016 | Wartmann | |
| 2002/0162515 A1 * | 11/2002 | Boyd | A01K 61/60 |
| | | | 119/223 |
| 2004/0123809 A1 * | 7/2004 | Klein | A01K 61/60 |
| | | | 119/223 |
| 2010/0050952 A1 | 3/2010 | Stillman et al. | |
| 2010/0294201 A1 | 11/2010 | Amils et al. | |
| 2011/0114028 A1 * | 5/2011 | Coffin | A01K 61/60 |
| | | | 119/201 |
| 2011/0265729 A1 | 11/2011 | Atz et al. | |
| 2012/0184001 A1 * | 7/2012 | Stephen | A01K 61/60 |
| | | | 435/134 |
| 2013/0251461 A1 * | 9/2013 | Fulde | E02D 17/20 |
| | | | 405/302.7 |
| 2013/0299040 A1 | 11/2013 | Atz et al. | |
| 2014/0359999 A1 * | 12/2014 | Wang | A01K 61/70 |
| | | | 29/428 |
| 2016/0100560 A1 | 4/2016 | Dornbierer | |

FOREIGN PATENT DOCUMENTS

| | | | |
|---|---|---|---|
| FR | 2945410 A1 | 11/2010 | |
| WO | 9613973 A1 | 5/1996 | |
| WO | WO-2004032613 A1 * | 4/2004 | ............ A01K 61/60 |
| WO | 2010049089 A1 | 5/2010 | |
| WO | 2013124070 A1 | 8/2013 | |

OTHER PUBLICATIONS

Abstract of FR 2945410.
European Search Report for corresponding application EP 15 18 7554 dated Feb. 11, 2016.
Abstract of EP 2664236.
Office Action for Swiss Patent Application No. CH 710238 dated Jan. 26, 2018, with partial translation.
Office Action for Chilean Patent Application No. 2015003040 dated Jan. 15, 2018, with partial translation.
Office Action for Canadian Patent Application No. 2906797 dated Jul. 11, 2018.
Suresh Kumar Mojjada, Imelda Joseph, P. S. Rao, C. K. Mukharjee, Shubhadeep Gosh and G. Syda Rao, Design, development and construction of open sea floating cage device for breeding and farming marine fish in Indian waters, Indian J. Fish., 60(1) : 61-65, 2013.
Examination Report for Australian Patent Application No. 2015238795 dated Aug. 28, 2018.
First Examination Report for New Zealand Patent Application No. 713223 dated Apr. 11, 2018.

* cited by examiner

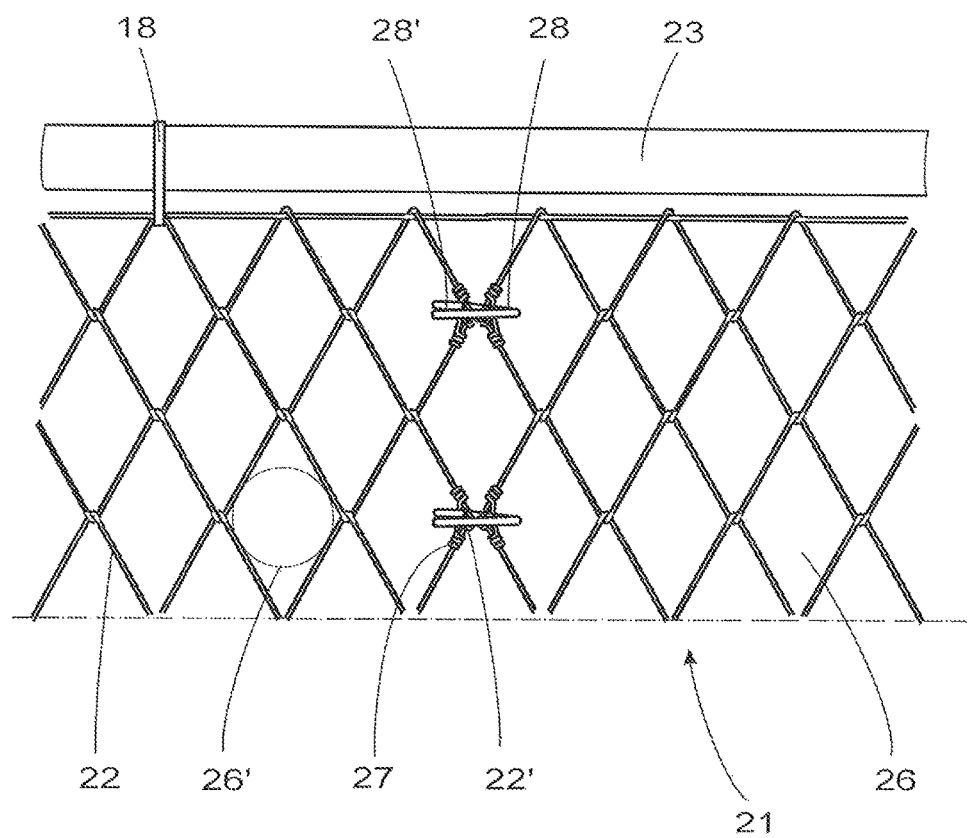

PROTECTIVE DEVICE FOR ANIMAL BREEDING, SUCH AS THE BREEDING OF FISH, MUSSELS OR MOLLUSKS

FIELD OF THE INVENTION

The invention relates to a protective device for animal breeding, such as the breeding of fish, mussels or mollusks, comprising at least one cage that can be positioned in a body of water and which is formed from a net and is dimensioned here with a mesh width such that animals to be bred are retained within the net.

BACKGROUND OF THE INVENTION

For fish farming, cages made of nets produced from elastic cords are used, as disclosed by publication WO-A-96/13973. The plastic nets made of a synthetic material are generally dimensioned with a cord diameter of, for example, between approximately 4 and 6 mm and relatively small mesh openings of 10 to 30 mm so that even young or small fish cannot escape. With these cages made of plastic nets, there is the risk that when the latter are assembled in open seas, predators such as sharks, seals or sea lions may rip open the cages from the outside with their mouth or will bump against said cages at a relatively high swimming speed and damage them so that the animals to be farmed may swim out in an undesirable manner at these damaged points.

OBJECT AND SUMMARY OF THE INVENTION

On this basis, the object underlying the present invention is to devise a protective device of the type specified at the start, by means of which, with simple assembly and improved securing, a long life span is achieved for the animals to be bred despite the predators. Furthermore, this protective device should enable easy cleaning.

According to the invention, this object is achieved by a protective device for animal breeding including at least one (inner) cage that can be positioned in a body of water and which is formed from a net and is dimensioned with a mesh width such that animals to be bred are retained within the net, and at least one outer cage that surrounds the at least one (inner) cage and is spaced apart from the at least one (inner) cage. The at least one outer cage includes a net made of thin wires and/or strands, with a mesh width of the net of the at least one outer cage being greater than the mesh width of the at least one (inner) cage. The at least one outer cage is designed to prevent predators from damaging the net of the at least one (inner) cage from the outside. The net of the at least one outer cage is formed from a wire mesh of individual helically bent wires, and the wire mesh is formed as a square diagonal mesh with rhomboid-shaped meshes and a three-dimensional mattress-like structure.

The cage positioned in the body of water is preferably totally surrounded by at least one outer cage spaced apart from the latter and which is produced from a net made of thin wires and/or strands, its mesh width being greater than that of the inner cage. By means of this outer cage, it is guaranteed that predators cannot damage the net from the outside and so cannot gain access to the inner cage, and the fish to be farmed cannot escape from the cage.

Very advantageously, the outer cage is clamped by longitudinal elements run to the bottom of the body of water so that the cage keeps its stable form even with strong currents in the body of water and so also retains more or less the required distance from the inner cage all around.

Further details of the protective device within the framework of the invention are defined in the dependent claims.

BRIEF DESCRIPTION OF THE DRAWINGS

Exemplary embodiments and further advantages of the invention will be described in more detail below by means of the drawings. These show as follows:

FIG. 3 is a diagrammatic outside view of the protective device according to FIG. 2.

DETAILED DESCRIPTION OF THE INVENTION

Figure 1:
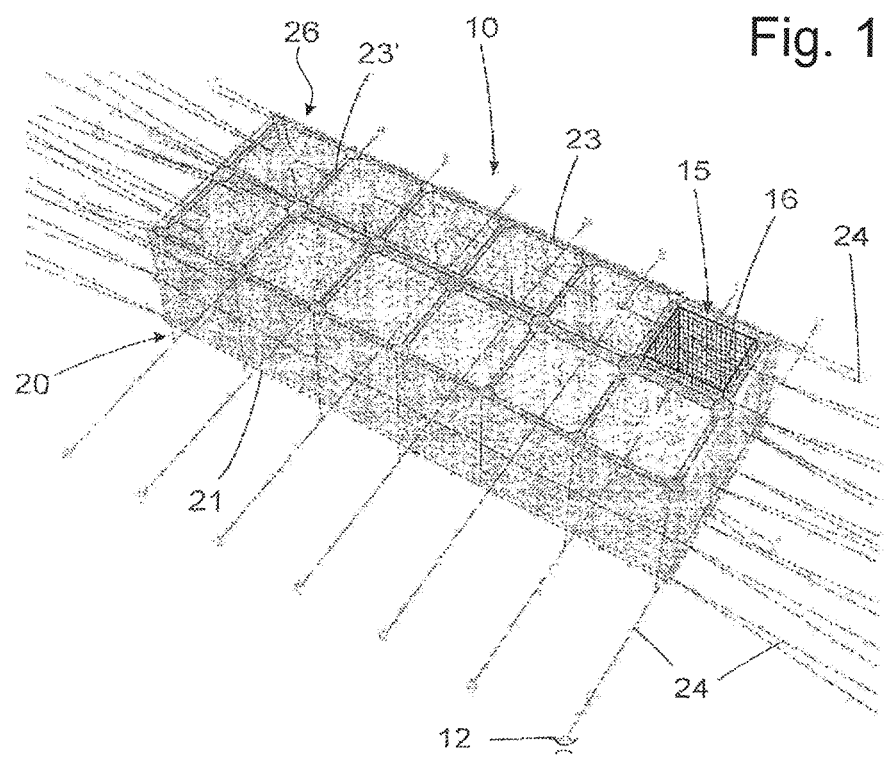
FIG. 1 is a diagrammatic perspective view of the protective device according to the invention.
Figure 2:
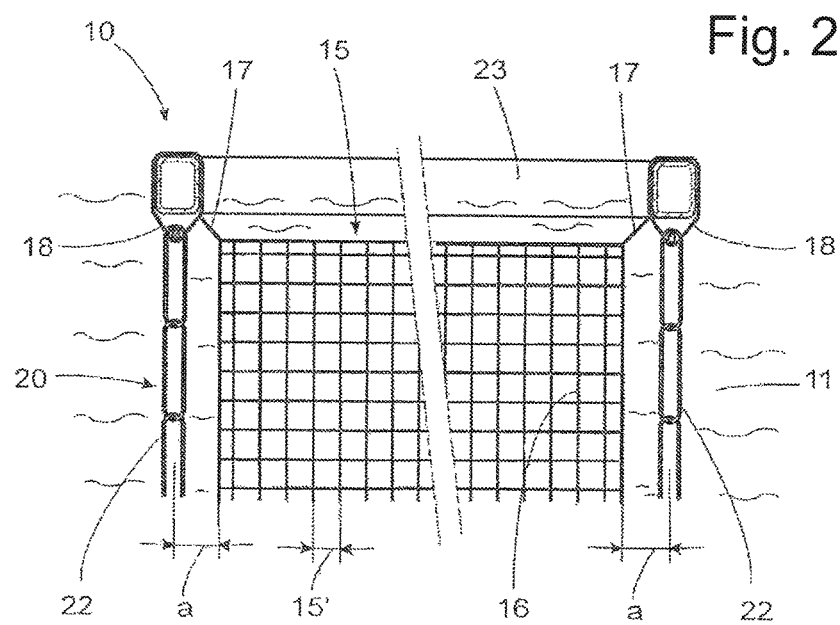
FIG. 2 is a diagrammatic partial section of the protective device according to FIG. 1.

FIGS. 1-3 show a protective device 10 for the breeding of animals in a body of water 11. It is preferably suitable for breeding fish in the open sea, and it can be dimensioned with a length of over 120 m. However, it could also be used for other breedable animals such as mussels and/or other mollusks, and can also have a round cylindrical or similar form.

In the present exemplary embodiment a number of cages 15 are provided that can be positioned in the body of water 11 and which are formed from modules, only one of which is illustrated. These cages 15 are produced from a net 16 and are dimensioned with a mesh width 15' such that the animals to be bred in the latter cannot swim through.

According to the invention, this cage 15 is preferably totally surrounded by at least one outer cage 20 a distance away and which is produced from a net 21 made of thin wires 22 and/or strands, the mesh width of the net 21 being greater than that of the inner cage 15 and it being guaranteed by means of this outer cage 20 that predators cannot damage the latter from the outside.

The outer cage 20 is held at the top by a floating frame 23, and corresponding fastening means 18 are provided. This frame 23 is sub-divided into twelve sections 23' into each of which an inner cage 15 can be inserted as a module. Needless to say, a different number of such sections or also none could also be provided.

The outer cage 20 is clamped by longitudinal elements 24 run to the bottom 12 of the body of water 11 so that the outer cage 20 keeps its stable form, even with strong currents in the body of water 11, and so that the specified distance "a" from the inner cage 15 is also retained more or less all around.

The inner cage 15 is held to the frame 23 and/or the cage 20, spaced apart from the latter, by connection elements 17 that are indicated. However, they can easily be removed from the outer cage 20 and be cleaned or replaced with new ones.

Advantageously, the net 21 of the outer cage 20 is produced from a wire mesh made of individual wires 22 that are bent helically. The wire mesh is formed as a square diagonal mesh with rhomboid-shaped meshes 26 and a three-dimensional mattress-like structure, the mesh widths 26' advantageously having dimensions of between 70 mm and 90 mm, whereas the mesh widths 15' of the net 16 of the inner cage are approximately 10 mm to 30 mm, this net 16 preferably being produced from plastic cords.

The wires 22 are preferably provided with a diameter of between 1 mm and 3 mm so that less accumulations of algae and mud form on the latter that have small surfaces and, moreover, can be cleaned easily.

In order to achieve sufficient strength, these thin wires 22 of the outer cage 20 are produced from high strength steel with a nominal strength of approximately 1,000 N/mm² or more. This can also be varied depending on the circumstances. In addition, the wires 22 are made of a rust- and saltwater-resistant material. It has thus surprisingly been shown that a long life span is achieved overall with this protective device 10 according to the invention.

The individual helically bent wires 22 of the wire mesh are connected to one another flexibly at their ends in pairs by loops 22' such that they do not form any cutting edges that injure the animals. For this purpose, after being bent round to form the loops 22', the wires 22 are additionally preferably provided with a number of nooses 27 wound around their own circumference. By means of these flexibly connected loops 22', it is guaranteed that this net 21 can be rolled up for transportation.

According to FIG. 3, the net 21 is preferably made up of a number of lengths, the latter being held together by connection means. Corrosion-resistant cords, pressure grips or the like are suitable as connection means. One such pressure grip 28, known in its own right and made of corrosion-protected wire, is shown which has two arms 28' projecting out of a rounded base and which are each provided on their free end with a hook, the two hooks being directed towards one another.

The invention is sufficiently demonstrated by the exemplary embodiments described above. However, it could also be illustrated by other variations.

The cage or cages of the protective device according to the invention could also consist purely of shells wherein the net walls project to the bottom and no net or a net is only partially provided on the lower side.

Depending on the circumstances in a body of water, the outer shell could be formed purely by a wall if, for example, the inner cage were positioned in a harbour-type environment.

Instead of the upper floating frame 23, with smaller cages in particular, just one cord or the like encompassing the cage could also be provided.

The invention claimed is:

1. A protective device for animal breeding, comprising:
   a plurality of inner cages, each of the inner cages being positionable in a body of water, formed from a net and dimensioned with a mesh width such that animals to be bred using the protective device are retained within the net,
   an outer cage that surrounds the inner cages and is spaced apart from the inner cages, the outer cage comprising a net made of thin wires and/or strands, with a mesh width of the net of the outer cage being greater than the mesh width of the inner cages, whereby the outer cage prevents predators from damaging the net of the inner cages from the outside, and
   an upper floating frame, the outer cage being held in its entirety by the upper floating frame, the upper floating frame being sub-divided into a number of sections into each of which one of the inner cages is insertable as a module,
   wherein the net of the outer cage is formed from a wire mesh of individual helically bent wires, wherein the wire mesh is formed as a square diagonal mesh with rhomboid-shaped meshes and a three-dimensional mattress-like structure,
   wherein a number of the inner cages are formed as modules to be inserted into the outer cage, and wherein the inner cages are each held to the upper floating frame and/or the outer cage by connection elements that enable easy removal of the inner cage from the outer cage for replacement and/or cleaning.

2. The protective device according to claim 1, wherein the outer cage is clamped by longitudinal elements which run to the bottom of the body of water so that the outer cage keeps a stable form even with strong currents in the body of water and so also retains a specified distance (a) from the inner cages all around.

3. The protective device according to claim 1, wherein each of the inner cages, made of a plastic material, is held all round by the connection elements which are spaced apart from the outer cage.

4. The protective device according to claim 1, wherein the thin wires and/or strands of the outer cage have a diameter of between 1 and 3 mm.

5. The protective device according to claim 1, wherein the net of the outer cage is formed with mesh widths of between 70 mm and 90 mm, whereas the mesh widths of each of the inner cages are 10 mm to 30 mm.

6. The protective device according to claim 1, wherein the thin wires and/or strands of the outer cage comprise high-strength steel with a nominal strength of at least 1,000 N/mm².

7. The protective device according to claim 1, wherein the thin wires and/or strands of each of inner cages are made of a rust- and saltwater-resistant material.

8. The protective device according to claim 1, wherein the individual helically bent wires of the wire mesh are connected to one another flexibly at their ends in pairs by loops so that they do not form any cutting edges.

9. The protective device according to claim 1, wherein the net of the outer cage comprises a number of lengths held together by at least one connection means.

10. The protective device according to claim 9, wherein the at least one connection means comprises a pressure grip.

11. The protective device according to claim 10, wherein the pressure grip comprises a corrosion-protected wire.

12. The protective device according to claim 11, wherein the pressure grip comprises two arms which are each provided on their free end with a hook, the two hooks being directed towards one another.

13. The protective device according to claim 1, wherein the modules form at least two rows of the inner cages.

14. The protective device according to claim 13, wherein one of the rows of the inner cages contains at least three linearly aligned inner cages.

15. The protective device according to claim 13, wherein one of the rows of the inner cages contains at least six linearly aligned inner cages.

16. The protective device according to claim 1, wherein the outer cage is dimensioned with a length of over 100 m.

17. The protective device according to claim 1, wherein the outer cage and the inner cages are cuboid-shaped.

18. The protective device according to claim 1, wherein the mesh widths of the outer cage have dimensions of between 70 mm and 90 mm and the mesh widths of the net of each of the inner cages are 10 mm to 30 mm, wherein the outer cage comprises high-strength steel with a nominal strength of at least 1,000 N/mm² and wherein the net of each of the inner cages comprises plastic cords.

* * * * *

UNITED STATES PATENT AND TRADEMARK OFFICE
CERTIFICATE OF CORRECTION

PATENT NO. : 10,271,527 B2
APPLICATION NO. : 14/880314
DATED : April 30, 2019
INVENTOR(S) : Urs Dornbierer Page 1 of 1

It is certified that error appears in the above-identified patent and that said Letters Patent is hereby corrected as shown below:

In the Claims

Claim 7, Column 4, Line 28, after "each of", insert --the--.

Signed and Sealed this
Fourth Day of June, 2019

Andrei Iancu
*Director of the United States Patent and Trademark Office*